United States Patent
Kawasaki

(10) Patent No.: US 10,444,004 B2
(45) Date of Patent: Oct. 15, 2019

(54) PHASE SHIFT INTERFEROMETER

(71) Applicant: Mitutoyo Corporation, Kawasaki, Kanagawa (JP)

(72) Inventor: Kazuhiko Kawasaki, Ibaraki (JP)

(73) Assignee: MITUTOYO CORPORATION, Kawasaki (JP)

(*) Notice: Subject to any disclaimer, the term of this patent is extended or adjusted under 35 U.S.C. 154(b) by 51 days.

(21) Appl. No.: 15/782,683

(22) Filed: Oct. 12, 2017

(65) Prior Publication Data

US 2018/0128593 A1    May 10, 2018

(30) Foreign Application Priority Data

Nov. 9, 2016   (JP) .................................. 2016-219153

(51) Int. Cl.
*G01B 9/02*    (2006.01)

(52) U.S. Cl.
CPC ....... *G01B 9/02079* (2013.01); *G01B 9/0201* (2013.01); *G01B 2290/30* (2013.01)

(58) Field of Classification Search
CPC ............ G01B 9/02079; G01B 9/02081; G01B 9/0201; G01B 9/02087
See application file for complete search history.

(56) References Cited

U.S. PATENT DOCUMENTS

| | | | | |
|---|---|---|---|---|
| 6,181,420 B1* | 1/2001 | Badami | ............... | G03F 7/70775 356/487 |
| 2002/0003628 A1* | 1/2002 | James | ................ | G01B 11/2441 356/521 |
| 2006/0227333 A1* | 10/2006 | Tearney | ............... | A61B 5/0059 356/512 |
| 2008/0285048 A1* | 11/2008 | Chen | .................. | G01B 11/2441 356/492 |
| 2016/0069664 A1* | 3/2016 | Yamanari | ........... | G01B 9/02091 356/479 |

FOREIGN PATENT DOCUMENTS

| | | |
|---|---|---|
| JP | H05-87541 | 4/1993 |
| JP | 2000-329535 | 11/2000 |
| JP | 4869656 | 2/2012 |

* cited by examiner

*Primary Examiner* — Shawn Decenzo
*Assistant Examiner* — Rufus L Phillips
(74) *Attorney, Agent, or Firm* — Rankin, Hill & Clark LLP

(57) ABSTRACT

The phase shift interferometer is configured to measure the shapes of measurement objects by acquiring a plurality of images of interference fringes while shifting the phases of the interference fringes. The interference fringes are provided with a phase difference of 90° relative to each other utilizing polarization of light. Images of the interference fringes are captured by two respective cameras while, in accordance with a conventional phase shift method, mechanically displacing a reference surface or a reference optical path to shift the phases. The phases of the interference fringes are calculated independently from the respective images acquired by the cameras and an average of the two phase calculation results is calculated.

4 Claims, 9 Drawing Sheets

100: LIGHT SOURCE
101: LOW COHERENCE LIGHT SOURCE
200: DELAY OPTICAL PATH
201,202: POLARIZED BEAM SPLITTER (PBS)
203: MIRROR
300: BEAM EXPANSION OPTICS
301: LENS
302: NON-POLARIZED BEAM SPLITTER (NPBS)
303: COLLIMATOR LENS
400: PHASE DIFFERENCE GENERATION UNIT
401: REFERENCE SURFACE
402: MEASUREMENT OBJECT
403: DISPLACEMENT STAGE
500: IMAGING LENS
600: PHASE DIFFERENCE DETECTION UNIT
601: λ/4 PLATE
602: BEAM SPLITTER
603a,603b: POLARIZER
604a,604b: CAMERA
700: PERSONAL COMPUTER (PC)

FIG. 1 Pior Art

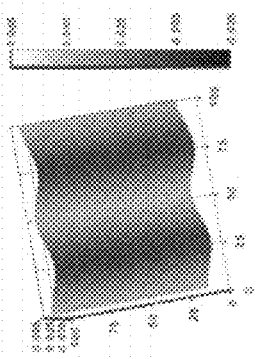
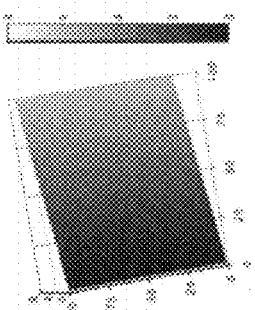
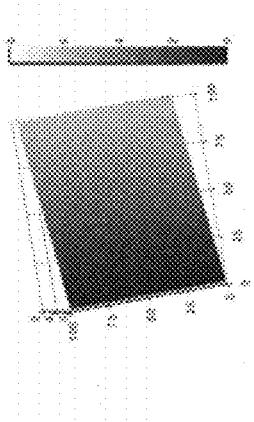
(a1) ANALYSIS RESULT $\phi_{Analysis}$    (a2) TRUE VALUE $\phi_{True}$    (a3) ANALYSIS ERROR $\phi_{Error} = \phi_{Analysis} - \phi_{True}$
FIG. 4

COHERENCE LENGTH: ΔL
OPTICAL PATH LENGTH DIFFERENCE: $L_b = l_b - l_a$
(a) IN CASE WHERE $\Delta L \geq L_b$
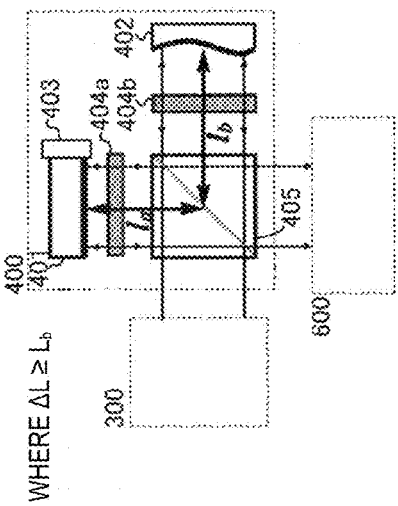
(b) IN CASE WHERE $\Delta L < L_b$
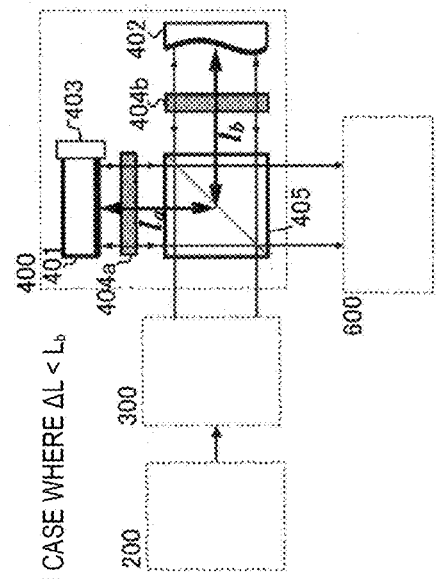
200: DELAY OPTICAL PATH
300: BEAM EXPANSION OPTICS
400: PHASE DIFFERENCE GENERATION UNIT
401: REFERENCE SURFACE
402: MEASUREMENT OBJECT
403: DISPLACEMENT STAGE
404a, 404b: λ/4 PLATE
405: POLARIZED BEAM SPLITTER
600: PHASE DIFFERENCE DETECTION UNIT
FIG. 7

PHASE SHIFT INTERFEROMETER

TECHNICAL FIELD

The present invention relates to phase shift interferometers, and in particular, relates to a phase shift interferometer that achieves reduced analysis errors due to shift errors and thus achieves high precision measurement using a reduced number of images (in a shorter time). The phase shift interferometer is suitable for use in measuring the shapes of measurement objects, such as optical flats, lenses, processed metal surfaces, and surfaces of semiconductors including wafers.

BACKGROUND ART

An interferometer is an instrument for measuring the shape of a measurement object with high precision by analyzing the phases of interference fringes, which are generated by a reflected beam from the reference surface and a reflected beam from the measurement object. Phase shift methods are techniques frequently used to analyze the phases of interference fringes (see Patent Literatures 1 to 3).

CITATION LIST

Patent Literature

Patent Literature 1: JP 05-87541 A
Patent Literature 2: JP 2000-329535 A
Patent Literature 3: JP 4869656 B

SUMMARY OF INVENTION

Technical Problem

FIG. 1 illustrates an example of an optical configuration of a Fizeau interferometer which is a frequently used configuration for the optics. Here, problems with the related art are described. The Fizeau interferometer is configured as follows. A light beam from a light source 1 is expanded to the field of view size of the interferometer using, for example, a lens 2, a pinhole 3, and a lens 5. A reference surface 6, which serves as a reference for measurement, and a measurement object 7 are irradiated with the expanded light beam. The reference beam, which is a beam reflected from the reference surface 6, and the measurement beam, which is a beam reflected from the surface of the measurement object 7, are caused to interfere with each other using a beam splitter 4. Phase shift methods are performed as follows. A plurality of interference fringes are obtained by shifting the relative phase between the reference beam and the measurement beam, the interference fringes are captured by, for example, a camera 8, and numerical analysis is performed to calculate the phases of the interference fringes.

A typical method used to shift the phase is to move the reference surface 6 parallel to an optical axis A using, for example, a displacement stage 9. In this case, the displacement is performed several times for one interference fringe cycle, and thus the reference surface 6 needs to be moved accurately by a distance of from several tens of nanometers to several hundreds of nanometers. However, it is extremely difficult to perform an accurate shift according to a calculated setting value in measurement environments, in which, for example, vibration or air disturbance occurs, let alone to produce a displacement stage 9 for enabling accurate displacement with nanometer precision. As a result, a difference occurs between the amount of shift predicted by calculation and the actual amount of shift, and this results in the occurrence of errors in calculation of the phase (referred to as phase analysis errors).

A typical method used to reduce the phase analysis errors is to increase the number of phase shifts to be made to increase the number of images acquired. These are methods that take advantage of the averaging effect by performing calculation from a greater number of images, or which predict a specific shift error and correspondingly provide a particular displacement that cancels the error. With these methods, as the analysis precision increases, the number of images acquired tends to increase.

That is, when performing high precision measurement using a phase shift interferometer of the related art, a displacement stage 9 for shifting the reference surface 6 with high precision, which is costly, is necessary. Another problem is that, to reduce the phase analysis errors resulting from the errors in the displacement of the displacement stage 9, the number of images acquired needs to be increased and a correspondingly longer measurement time is required. In addition, a further problem is that, when the measurement time is long, the gradual shift of the position of the reference surface 6 due to vibrations and temperature changes in the measurement environment is more likely to be affected, and therefore, depending on the use environment of the user, the effect of improving the precision cannot be achieved sufficiently.

Patent Literatures 1 to 3, similarly to the invention, disclose technologies for, using a plurality of imaging devices, simultaneously imaging interference fringes having phases optically shifted relative to each other. However, the technologies have many limitations.

The invention has been made to solve the problems with the related art. Accordingly, an object of the invention is to provide a phase shift interferometer for shape measurement which is formed by less costly components and achieves high precision shape measurement in a shorter time.

Solution to Problem

The invention provides a phase shift interferometer to solve the above problems. The phase shift interferometer is configured to measure a shape of a measurement object by analyzed interference fringes by a phase shift method. The interference fringes are generated by a reference beam and a measurement beam or by distortion in a reference optical path and a measurement optical path. The reference beam is a reflected beam from a reference surface serving as a reference for measurement. The measurement beam is obtained by reflection of a beam from a measurement object or propagation of a beam through the measurement object. The reference optical path does not include the measurement object disposed on the reference optical path. The measurement optical path includes the measurement object disposed on the measurement optical path. The phase shift interferometer is further configured to capture images of the interference fringes using a plurality of cameras, independently perform phase analysis of each of the interference fringes, the interference fringes being each obtained by each of the plurality of cameras, and then synthesize results of the phase analysis to calculate the shape of the measurement object.

The images of the interference fringes may be provided with a phase difference relative to each other. The plurality of cameras may be two cameras provided with a phase difference of 90° relative to each other, and the two cameras may be configured to capture the images of the interference fringes, to thereby measure the shape of the measurement object.

Furthermore, the results of the phase analysis may be synthesized by calculating averages of the results of the phase analysis, each of the averages being an average of results obtained from a set of corresponding pixels of the plurality of cameras.

Furthermore, the phase shift method may be implemented by extending or shortening a length of the reference optical path or a length of the measurement optical path.

Furthermore, the length of the reference optical path or the length of the measurement optical path may be extended or shortened by moving the reference surface or the measurement object or increasing or decreasing a delay optical path.

Advantageous Effects of Invention

Phase shift interferometers of the related art require a precisely fabricated displacement stage for displacing the reference surface. In contrast, with the invention, phase analysis errors can be minimized even if there is a shift error in the displacement stage. Accordingly, it suffices to use a displacement stage that is relatively low precision and less costly. While there is no need to perform extra measurements to reduce errors, high precision measurement is achieved.

BRIEF DESCRIPTION OF DRAWINGS

FIG. 4 is a diagram illustrating an example of results of analysis according to the first embodiment.

FIG. 7 is a ray diagram illustrating a configuration according to a third embodiment of the invention.

DESCRIPTION OF EMBODIMENTS

Hereinafter, embodiments of the present invention will be described in detail with reference to the drawings. Note that the present invention is not intended to be limited to the content described in the following embodiments and examples. The constituent elements described in the following embodiments and examples include elements that could easily be conceived by one skilled in the art, elements that are substantially the same thereas, and what is referred to as equivalent in scope thereas. Furthermore, the constituent elements disclosed in the following embodiments and examples may be combined as appropriate, or selected and used as appropriate.

Figure 1:
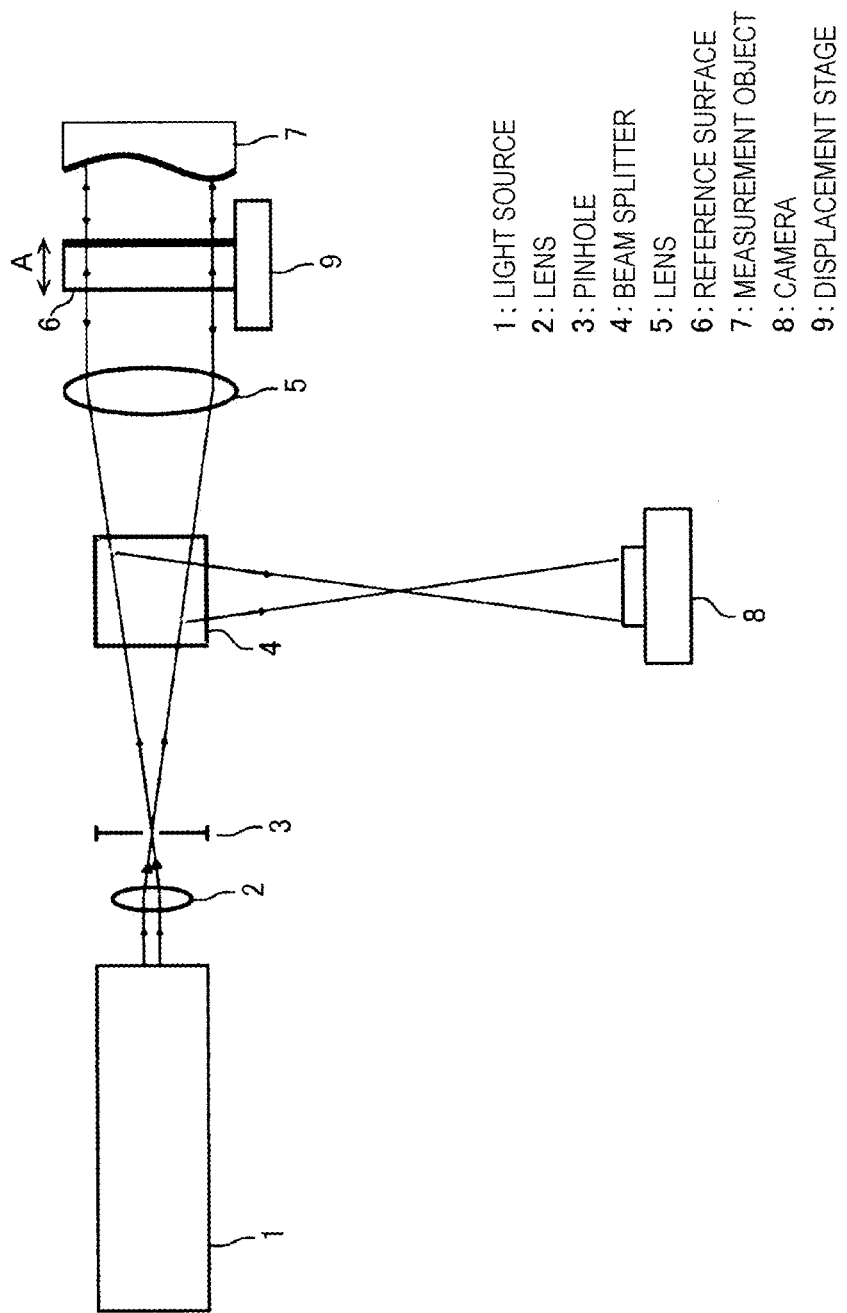
FIG. 1 is a ray diagram illustrating a configuration example of the optics in a Fizeau phase shift interferometer of the related art.
Figure 2:
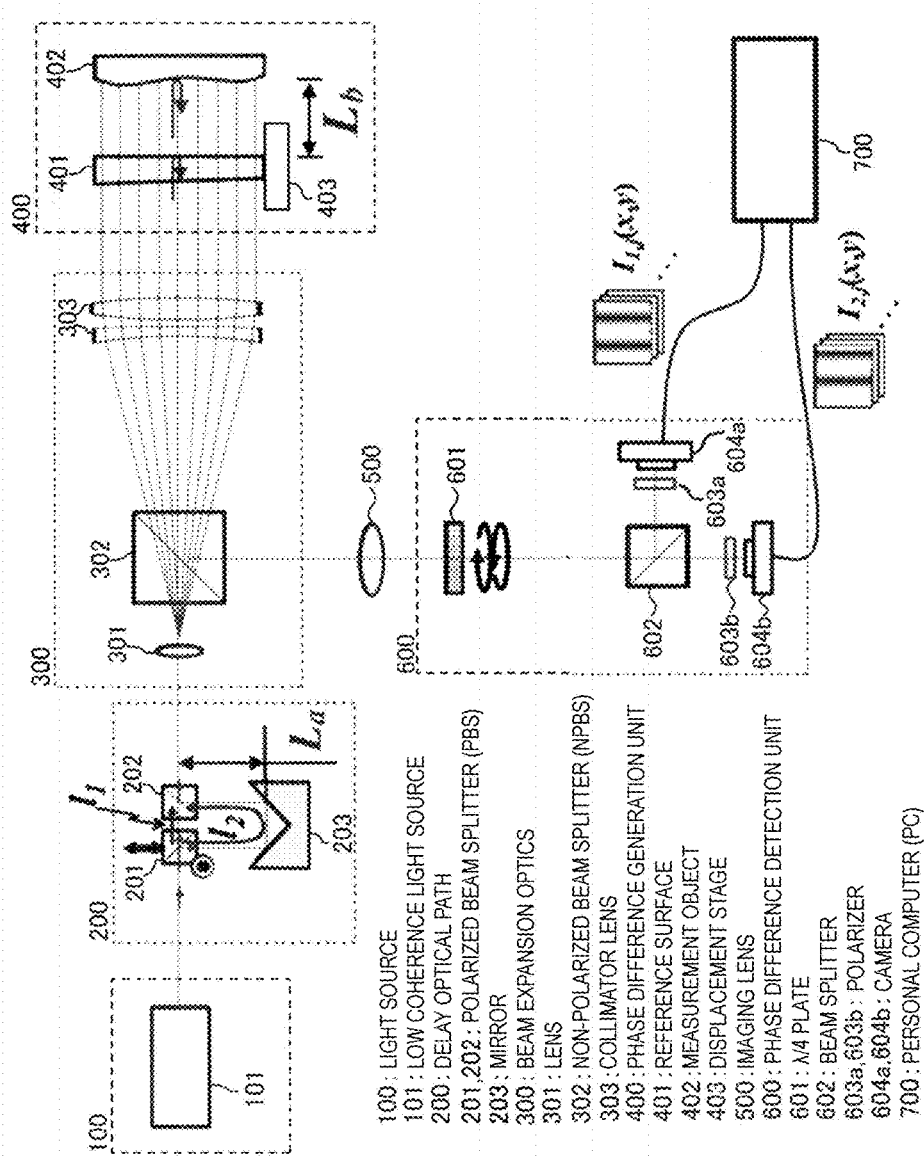
FIG. 2 is a ray diagram illustrating a configuration according to a first embodiment of the invention.

FIG. 2 illustrates a configuration of a phase shift interferometer according to a first embodiment of the invention. A light beam from a low coherence light source 101 is split into two components each having a plane of polarization orthogonal to the other. The low coherence light source 101 is a light source 100. In this embodiment, the light beam is split into a light beam $l_1$, which is horizontally polarized, and a light beam $l_2$, which is vertically polarized, by a polarized beam splitter (PBS) 201, which is a constituent of a delay optical path 200. The vertically polarized reflection light beam is diverted by being reflected by a mirror 203 and thereafter the horizontally polarized beam and the vertically polarized beam are combined by a PBS 202. Subsequently, the combined light beam is expanded and collimated by beam expansion optics 300, which is constituted by a lens 301, a non-polarized beam splitter (NPBS) 302, and a collimator lens 303. Thereafter, a reference surface 401 and a measurement object 402 of the phase difference generation unit 400 are irradiated with the light beams to obtain a reference beam and a measurement beam, which are reflected beams from the reference surface 401 and the surface of the measurement object 402, respectively. The phase difference generation unit 400 is disposed on the same optical axis, as with Fizeau phase shift interferometers of the related art. In the figure, the reference symbol 403 denotes a displacement stage.

The light beams for analysis, which are constituted by the reference beam and the measurement beam, are extracted from the beam expansion optics 300 by the NPBS 302 to be passed through an imaging lens 500. The imaging lens 500 is merely intended to allow flexibility in the optical design, such as the imaging magnification and focal position for interference fringes in the phase shift interferometer. Thus, the presence or absence of the imaging lens 500 does not have a significant influence on the principle of the invention.

Subsequently, the light beams of the horizontally polarized beam and the vertically polarized beam are passed through a λ/4 plate 601 of a phase difference detection unit 600 to be converted to circularly polarized beams each rotating in the opposite direction to the other, right-hand or left-hand direction. Thereafter, the light beams for analysis are split by a beam splitter 602, and on the respective split optical paths, polarizers 603a and 603b, which are relatively rotated and adjusted, are positioned. In this manner, the phase difference of the reflected beam from the measurement object 402 with respect to the reference surface 401 is visualized as an interference fringe. Images of the interference fringes having different phases are imaged by two respective cameras 604a and 604b.

In this phase shift interferometer, the optical path length difference $L_a$ for diversion and the optical path length difference $L_b$ between the optical path of the reflected beam from the reference surface 401 and the optical path of the reflected beam from the surface of the measurement object 402 are matched with each other. Furthermore, the light source 100 is the low coherence light source 101, which has a coherence length ΔL shorter than the optical path length difference $L_a$. As a result, the interference fringes caused to be visible by the light beams passed through the polarizers 603a and 603b, which are disposed on the respective split optical paths, are generated only by the light beam of the vertically polarized beam component, which is the reflected beam from the reference surface 401, and the horizontally polarized beam component, which is the reflected beam from the surface of the measurement object 402. The interference fringes obtained by the two cameras 604a and 604b each have a phase shifted with respect to the other according to the setting angles for the polarizers 603a and 603b, which are disposed in front of the cameras 604a and 604b. For example, the polarizer 603b may be positioned with the transmission axis thereof being rotated in a plane perpendicular to the optical axis by 45° relative to the transmission axis of the polarizer 603a. As a result, the phases of the interference fringes will be shifted by 90° relative to each other. The interference fringes are imaged by the cameras 604a and 604b and processed by a personal computer (PC) 700, for example.

Figure 3:
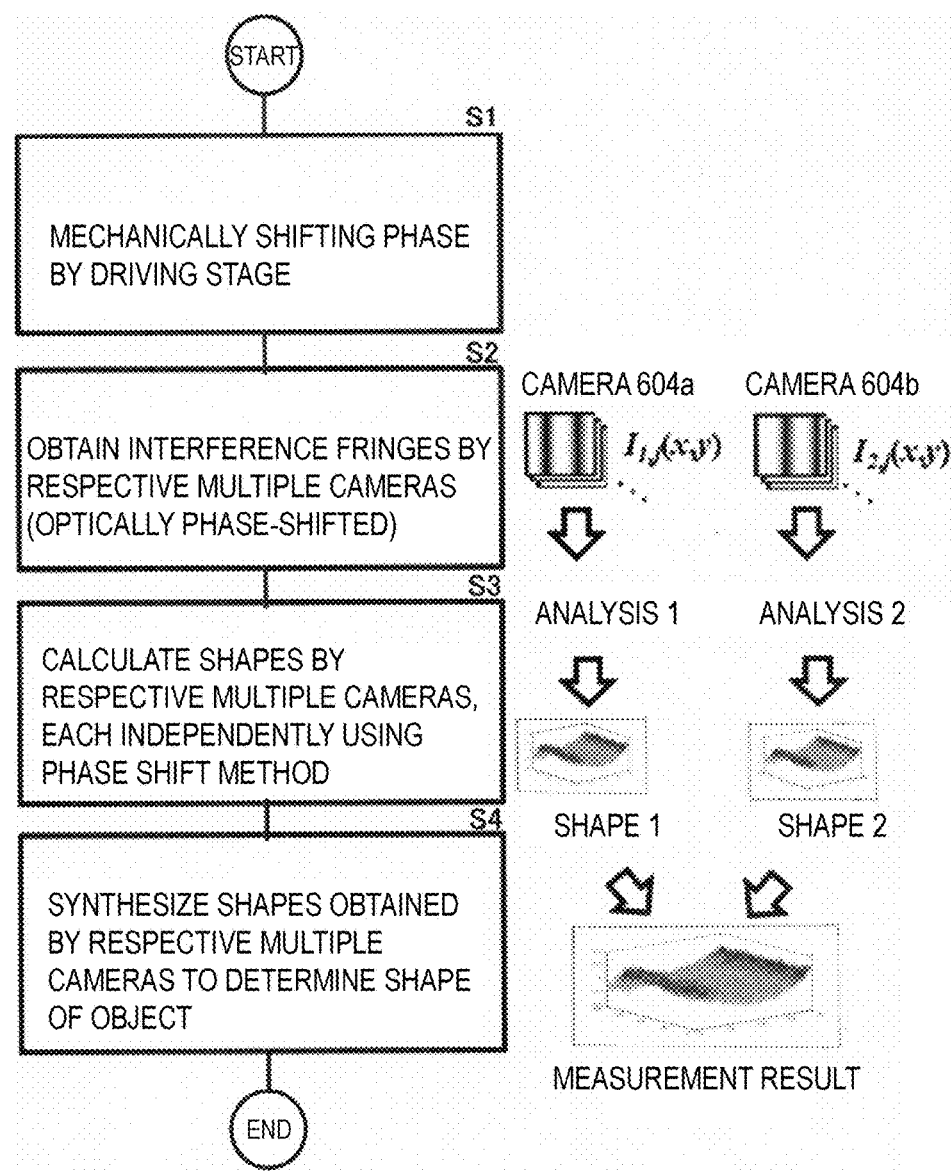
FIG. 3 is a flowchart illustrating a measurement procedure according to the first embodiment.

Next, FIG. 3 illustrates a measurement procedure by the phase shift interferometer of this embodiment. In accordance with a conventional phase shift method, the displacement stage 403 is slightly shifted in parallel mechanically to shift the phases of the interference fringes (step S1), and images of the interference fringes are obtained by the two cameras 604a and 604b in the phase difference detection unit 600 (step S2). The two cameras 604a and 604b are optically phase shifted relative to each other. Next, in accordance with a conventional phase shift method, the phases of the interference fringes in the images acquired by the two cameras 604a and 604b are each analyzed, and shape calculation is performed independently for each of them using the PC 700 (step S3). Subsequently, the shapes obtained via the cameras 604a and 604b are synthesized by, for example, addition to determine the shape of the measurement object 402 (step S4).

Now, examples of the effects of this embodiment are provided below. In the four-phase step method, in which one cycle of the phase of an interference fringe is divided into four segments and the phase is shifted by 90° for each segment, the four images of the interference fringe are represented by the following equations. The wavelength of the light source 101 determines the amount of displacement. For example, when the wavelength is 633 nm, the amount of displacement per step is approximately 79 nm.

[Equation 1]

$$\begin{cases} I_1(x, y) = B(x, y) - A(x, y)\cos[\phi(x, y)] & (1) \\ I_2(x, y) = B(x, y) - A(x, y)\cos\left[\phi(x, y) + \frac{\pi}{2}\right] & (2) \\ I_3(x, y) = B(x, y) - A(x, y)\cos[\phi(x, y) + \pi] & (3) \\ I_4(x, y) = B(x, y) - A(x, y)\cos\left[\phi(x, y) + \frac{3\pi}{2}\right] & (4) \end{cases}$$

By performing the following calculation on the basis of the four equations, Φ can be determined, and by performing a phase unwrapping process, the shape of the measurement object 402 can be determined.

[Equation 2]

$$\phi(x, y) = -\tan^{-1}\left[\frac{I_2(x, y) - I_4(x, y)}{I_1(x, y) - I_3(x, y)}\right] \quad (5)$$

Here, in the process of shifting from $I_1$ to $I_2$, $I_3$, and $I_4$, if a shift different from a calculated setting value (here, corresponding to a phase of 90°) is made, the result of the calculation of Equation (5) will be affected by the shift error. As an example, FIG. 4 illustrates the result of a simulation of a case where a shift error Er1 has occurred in $I_2$. In FIG. 4, (a1) illustrates an analysis result $\Phi_{Analysis}$ and (a2) illustrates a true value in the simulation $\Phi_{True}$. (a3) illustrates a phase analysis error $\Phi_{error}$ representing the difference between the analysis result and the true value, $\Phi_{Analysis} - \Phi_{True}$. As illustrated in FIG. 4, $\Phi_{True}$ is a value based on the assumption that an ideal plane is tilted so that only one interference fringe can be generated. As illustrated in (a3), the cycle of the phase analysis error is half the cycle of the phase of the interference fringe (twice the frequency) with the amount increasing and decreasing in the cycle. The results are designated as the results of shape calculation by a phase shift method from the interference fringes obtained by the one camera 604a.

Figure 5:
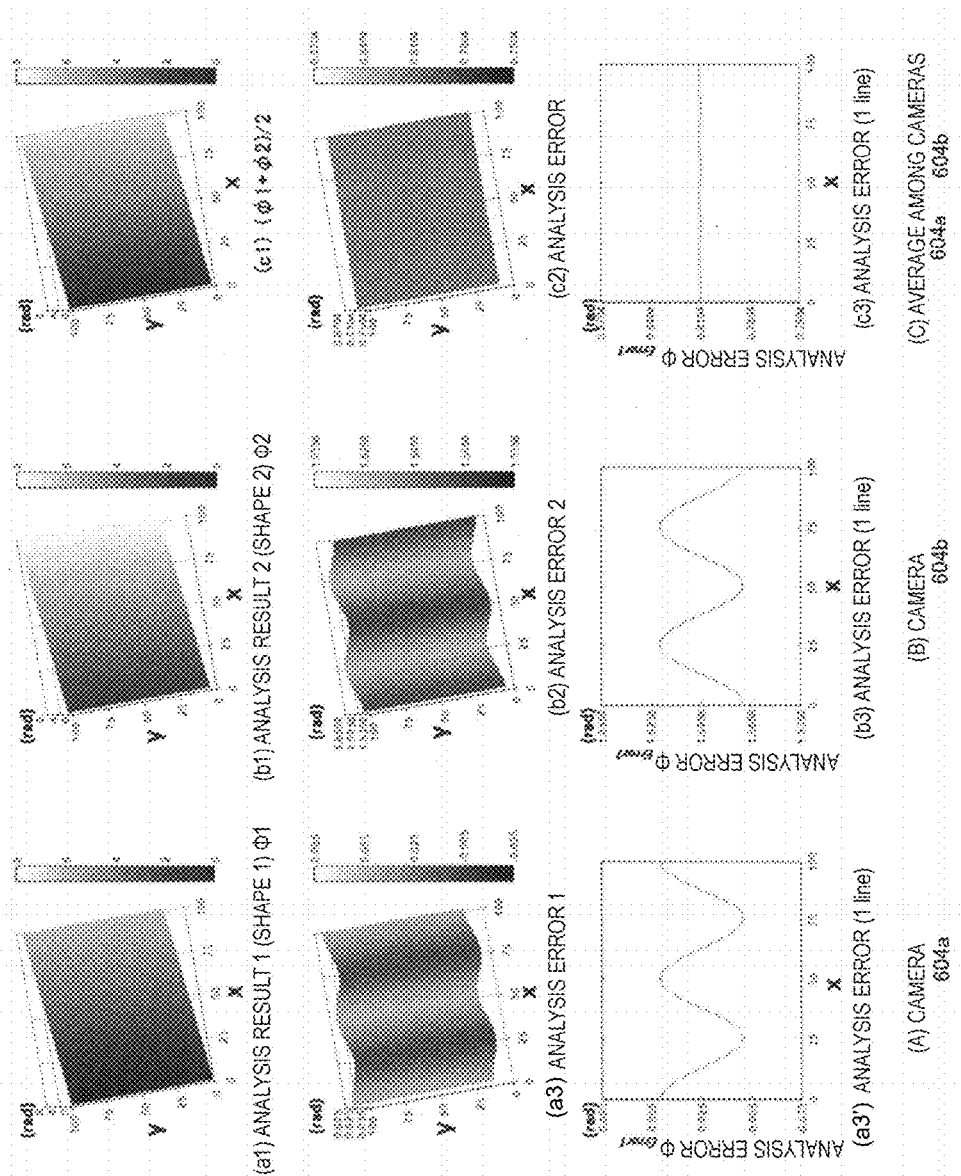
FIG. 5 is a diagram illustrating a comparison between examples of results of analysis performed on the outputs from two cameras according to the first embodiment.

Next, FIG. 5 illustrates the results of shape calculation from four interference fringe images obtained by the other camera 604b. The interference fringes have a phase shifted by a fixed angle of 90° with respect to the phase of the interference fringes obtained by the camera 604a. The phase analysis results illustrated in FIG. 4 are again illustrated in FIG. 5 at (a1) and (a3) for comparison. Phase analysis errors have a frequency twice the frequency of the phase of the interference fringe. Thus, by offsetting the initial phase of the interference fringe obtained by the camera 604b by 90° with respect to the phase of the interference fringe obtained by the camera 604a, the phase analysis error is caused to be in exactly inverted form. Accordingly, as illustrated at (c1), (c2), and (c3), phase analysis errors can be canceled by calculating the average of the results of calculation from each set of pixels representing an identical position, among the pixels of the camera 604a and the camera 604b.

Phase shift interferometers of the related art require a precisely fabricated displacement stage 9 for shifting the reference surface 6 to prevent the occurrence of errors corresponding to the phase of an interference fringe. In addition, to reduce phase analysis errors due to shift errors, a large number of images of interference fringes need to be acquired and accordingly a longer period of time is necessary for the measurement. As indicated by the results of the simulation, the technique of the invention minimizes phase analysis errors even when there is a shift error in the displacement stage 403, and therefore it suffices to use a displacement stage 403 that is relatively low precision and less costly. High precision measurement can be achieved with a fewer number of images acquired.

In this embodiment, a λ/4 plate is not used in the phase difference generation unit 400 and therefore measurement of spherical surfaces of lenses is also possible.

Figure 6:
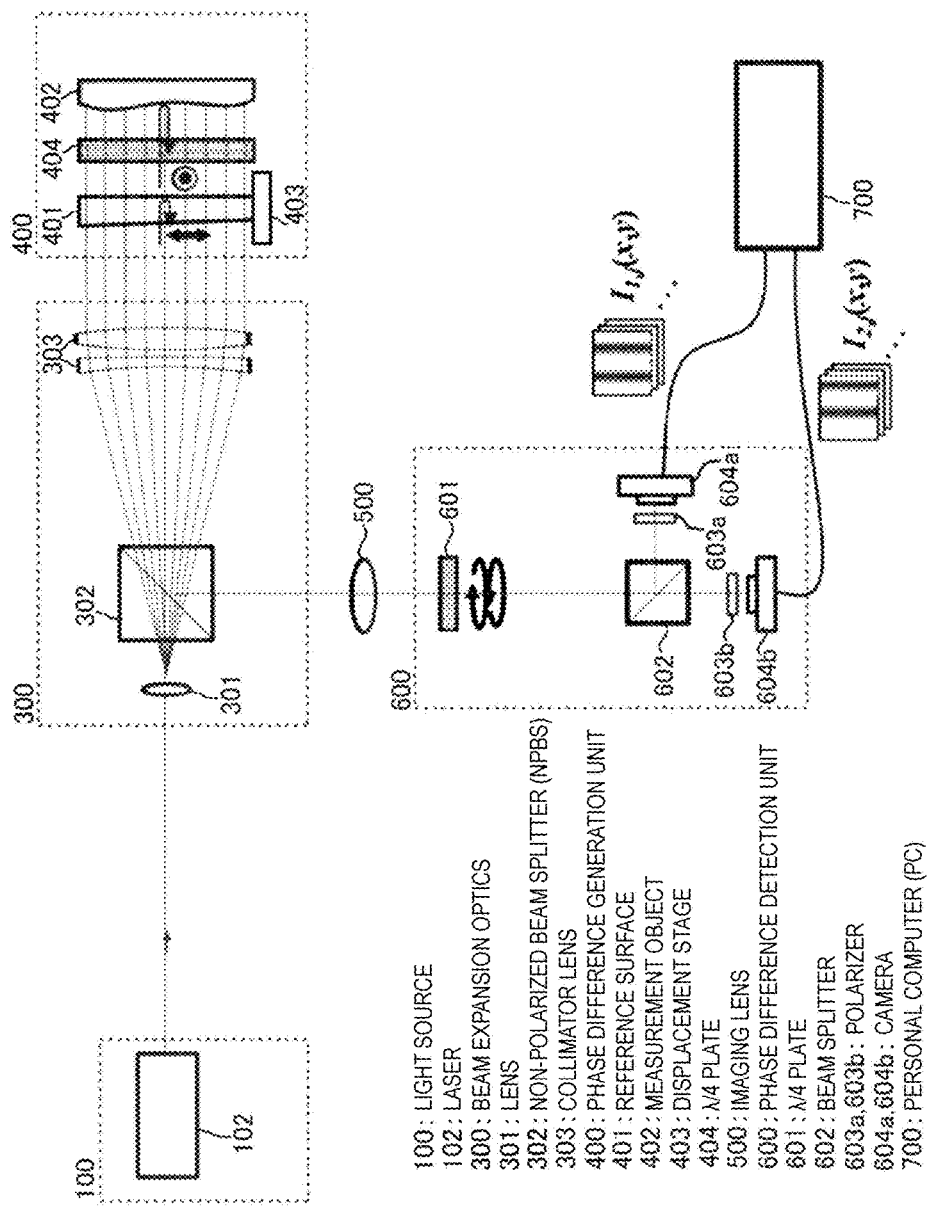
FIG. 6 is a ray diagram illustrating a configuration according to a second embodiment of the invention.

The constituent elements of the phase shift interferometer are not limited to those of the first embodiment illustrated in FIG. 2. For example, as in a second embodiment illustrated in FIG. 6, the optics may be as follows. The light source 100 may be a laser 102. A λ/4 plate 404 may be disposed between the reference surface 401 and the surface of the measurement object 402 to rotate the plane of polarization of the reflected beam from the surface of the measurement object 402 by 90° without using the delay optical path 200. This configuration also achieves a phase shift interferometer that produces a similar effect. The other constituent elements and operations are similar to those of the first embodiment, and thus such elements are assigned the same reference symbols and descriptions thereof are omitted.

In the second embodiment, since the laser 102, a high coherence light source, is used as the light source 100, the setting is easy.

Furthermore, for example, as in a third embodiment illustrated in FIG. 7, a phase shift interferometer of the Twyman-Green type may be employed. In the phase shift interferometer, a polarized beam splitter 405 is provided in the phase difference generation unit 400 to split the light beam into a reference beam and a measurement beam and to combine the beams. 404a and 404b in FIG. 7 each denote a λ/4 plate. The other constituent elements and operations are similar to those of the first embodiment, and thus such elements are assigned the same reference symbols and descriptions thereof are omitted.

In the first to third embodiments, the reference surface 401 is to be displaced. Instead, the measurement object 402 may be displaced. Furthermore, in the first embodiment, the optical path length of the light beam $l_2$ may be increased and decreased by displacing the mirror 203 in the delay optical path 200.

Figure 8:
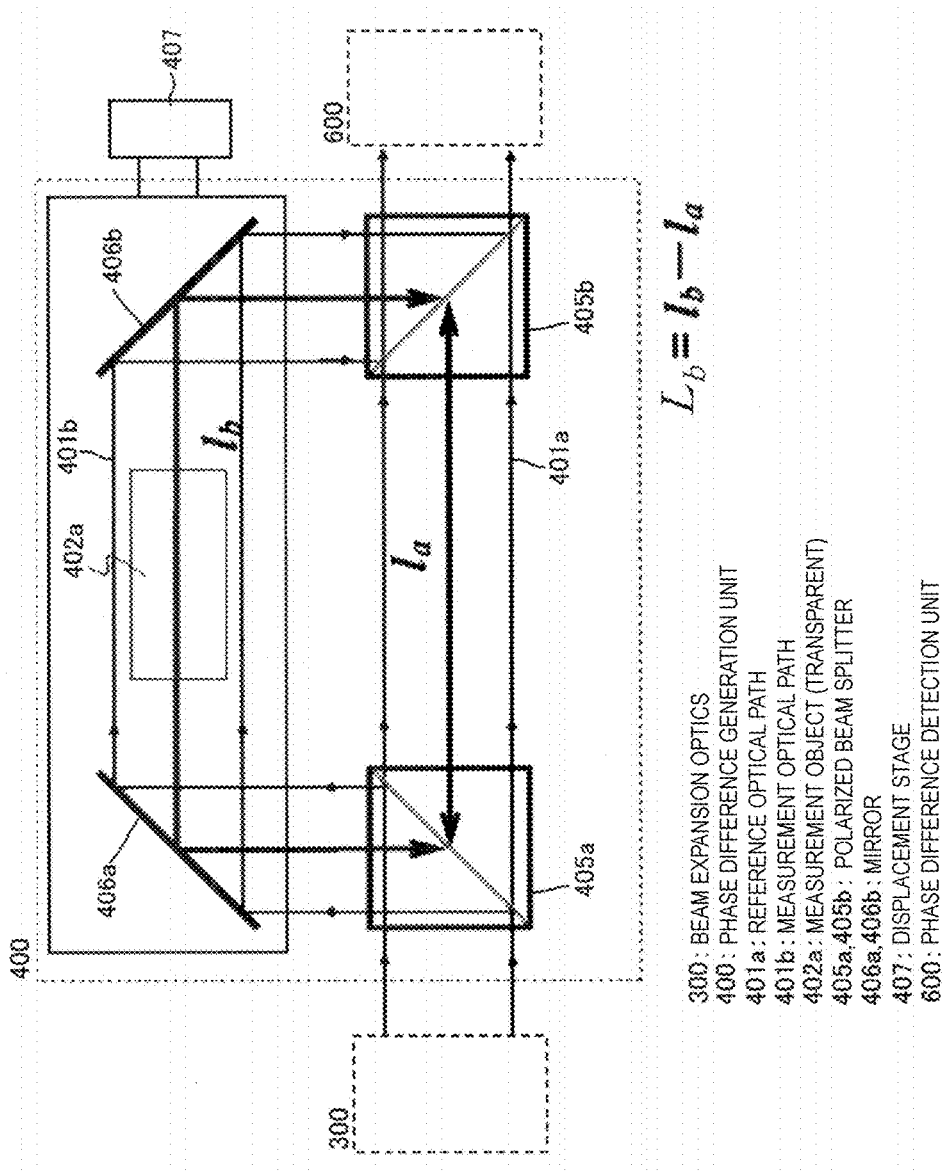
FIG. 8 is a ray diagram illustrating a configuration according to a fourth embodiment of the invention.

As in a fourth embodiment illustrated in FIG. 8, an interferometer of the Mach-Zehnder type may be employed. The interferometer is often used to measure the shape of the wavefront of a light beam passing through a measurement object 402a, which is a transmissive object. The measurement object 402a is disposed among polarized beam splitters 405a and 405b and mirrors 406a and 406b, which are provided in the phase difference generation unit 400. In this case, the shift phase can be carried out by, for example, placing the mirror 406a and the mirror 406b on a displacement stage 407 and moving the stage 407.

In the embodiment of FIG. 8, no reference surface is provided, and one of the optical paths (the lower optical path in the figure) serves as a reference optical path 401a. The one of the optical paths does not include the measurement object 402a. That is, by measuring, using interferometry, the relative wavefront distortion between the lower reference optical path 401a, in which there is no object, and the upper measurement optical path 401b, in which the measurement object 402a is disposed, the distortion due to the measurement object 402a is measured.

In FIG. 8, the optics is that for the case where $\Delta L \leq L_b$. In the case where $\Delta L < L_b$ with the use of a low coherence light source, the delay optical path 200 may be added to the optics to implement the embodiment as (b) in FIG. 7. The measurement object 402a may be disposed between the polarized beam splitters 405a and 405b.

Figure 9:
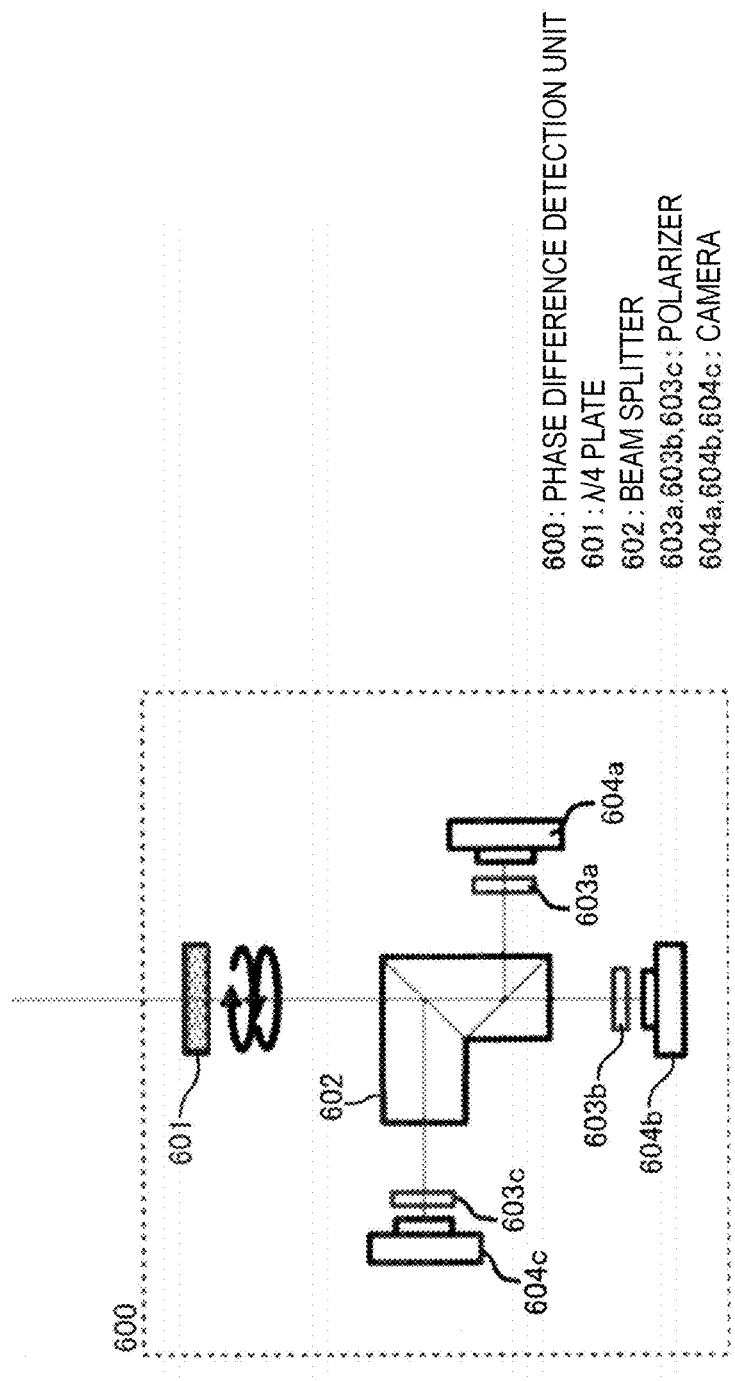
FIG. 9 is a ray diagram illustrating a configuration according to a fifth embodiment of the invention.

In the phase difference detection unit 600, the number of the cameras in the imaging system is not limited to two. As in a fifth embodiment illustrated in FIG. 9, three or more cameras may be used (in FIG. 9, three cameras, 604a, 604b, and 604c). This configuration also achieves the effect of reducing errors.

In the embodiment described above, the phase difference between the interference fringes obtained by the two cameras 604a and 604b is 90°. However, if a phase analysis error having the same cycle as the phase of the interference fringe (a fundamental wave) occurs, the amount of the phase difference to be provided between the two cameras 604a and 604b may be set to 180° to cancel the error. If a phase analysis error having a cycle one third the cycle of the phase of the interference fringe (a triple wave) occurs, a phase difference of 60° may be provided. An effective way to provide the phase difference between the cameras 604a and 604b is, for example, to adjust the angles of the transmission axes of the polarizers 603a and 603b in such a manner as to cancel the phase analysis errors that can be caused by, for example, the characteristics of the displacement stage 403 for displacing the reference surface. The polarizers 603a and 603b are disposed immediately in front of the cameras 604a and 604b. Even if the phase difference between the interference fringes obtained by the cameras 604a and 604b is 0°, i.e., the phases of the two are identical, the invention is effective because errors due to random noise, such as electrical noise, can be reduced.

REFERENCE SIGNS LIST

100 Light source
200 Delay optical path
201, 202 Polarized beam splitter (PBS)
300 Beam expansion optics
302 Non-polarized beam splitter (NPBS)
400 Phase difference generation unit
401 Reference surface
401a Reference optical path
401b Measurement optical path
402, 402a Measurement object
403, 407 Displacement stage
404a, 404b, 601 λ/4 plate
500 Imaging lens
600 Phase difference detection unit
602 Beam splitter
603a, 603b, 603c Polarizer
604a, 604b, 604c Camera
700 Personal computer (PC)

The invention claimed is:

1. A phase shift interferometer configured to measure a shape of a measurement object by analyzed interference fringes by a phase shift method,
the interference fringes being generated by a reference beam and a measurement beam or by distortion in a reference optical path and a measurement optical path,
the reference beam being a reflected beam from a reference surface serving as a reference for measurement,
the measurement beam being obtained by reflection of a beam from a measurement object or propagation of a beam through the measurement object,
the reference optical path not including the measurement object disposed on the reference optical path,
the measurement optical path including the measurement object disposed on the measurement optical path,
the phase shift interferometer comprising:
means for shifting phases of the interference fringes relative to each other;
a plurality of cameras configured to capture images of the interference fringes;
a plurality of polarizers, each of the plurality of polarizers being disposed in front of each of the plurality of cameras, angles of transmission axes of the polarizers being shifted with each other in such a manner as to cancel a phase analysis error caused by characteristics of the means for shifting phases of the interference fringes;
means for independently performing phase analysis of each of the interference fringes in the images captured by each of the plurality of cameras to obtain results of the phase analysis;
means for synthesizing the results of the phase analysis to calculate the shape of the measurement object; and
means for calculating an average of the results of the phase analysis, each of the results being obtained from each set of pixels captured by each of the plurality of cameras, the each set of pixels representing an identical position.

2. The phase shift interferometer according to claim 1, wherein images of the interference fringes are provided with a phase difference relative to each other, the plurality of cameras are two cameras provided with a phase difference of 90° relative to each other, and the two cameras are configured to capture the images of the interference fringes, to thereby measure the shape of the measurement object.

3. The phase shift interferometer according to claim 1, wherein the phase shift method is implemented by extending or shortening a length of the reference optical path or a length of the measurement optical path.

4. The phase shift interferometer according to claim 3, wherein the length of the reference optical path or the length of the measurement optical path is extended or shortened by moving the reference surface or the measurement object or increasing or decreasing a delay optical path to implement a phase shift.

* * * * *